US008023949B2

(12) United States Patent
Horton, Jr. et al.

(10) Patent No.: US 8,023,949 B2
(45) Date of Patent: Sep. 20, 2011

(54) SYSTEM AND METHOD FOR MANAGING COMMUNICATIONS WITH MOBILE PLATFORMS OPERATING WITHIN A PREDEFINED GEOGRAPHIC AREA

(75) Inventors: Edwin T. Horton, Jr., Wildwood, MO (US); Timothy M. Mitchell, Seattle, WA (US); Wayne F. Cavanaugh, Kent, WA (US)

(73) Assignee: The Boeing Company, Chicago, IL (US)

( * ) Notice: Subject to any disclaimer, the term of this patent is extended or adjusted under 35 U.S.C. 154(b) by 970 days.

(21) Appl. No.: 11/417,309

(22) Filed: May 2, 2006

(65) Prior Publication Data

US 2007/0184846 A1 Aug. 9, 2007

Related U.S. Application Data

(63) Continuation-in-part of application No. 10/655,923, filed on Sep. 5, 2003, now abandoned.

(60) Provisional application No. 60/409,335, filed on Sep. 9, 2002, provisional application No. 60/408,846, filed on Sep. 6, 2002.

(51) Int. Cl.
  *H04W 36/00* (2009.01)

(52) U.S. Cl. .................. 455/441; 455/456.1; 455/456.2; 455/456.3; 455/456.4; 455/456.5; 455/456.6; 455/437; 455/438; 455/439; 455/440; 455/442; 455/443; 455/444; 455/404.2

(58) Field of Classification Search ............... 455/404.2, 455/456.1–457, 436–444, 441
  See application file for complete search history.

(56) References Cited

U.S. PATENT DOCUMENTS

| 5,887,262 | A | * | 3/1999 | Willhoff ..................... 455/452.1 |
| 6,154,450 | A | * | 11/2000 | Wallentin et al. ............. 370/311 |
| 6,384,783 | B1 | | 5/2002 | Smith et al. |
| 6,483,454 | B1 | * | 11/2002 | Torre et al. ...................... 342/30 |
| 7,082,305 | B2 | * | 7/2006 | Willars et al. .................. 455/441 |
| 2005/0048932 | A1 | * | 3/2005 | Balasubramaniyan et al. 455/93 |
| 2006/0057964 | A1 | * | 3/2006 | Roy et al. .................... 455/67.11 |

FOREIGN PATENT DOCUMENTS

| EP | 1 081 974 A | | 3/2001 |
| EP | 1081974 A2 | * | 7/2001 |
| GB | 2 271 486 A | | 4/1994 |

\* cited by examiner

*Primary Examiner* — Patrick Edouard
*Assistant Examiner* — Aung Win
(74) *Attorney, Agent, or Firm* — Harness, Dickey & Pierce, P.L.C.

(57) ABSTRACT

A system and method for providing communications within an airfield between an aircraft component located upon an aircraft and an airport data network. A control computer is used to select an optimal antenna substation from a plurality of antenna substations disposed about the airfield for the aircraft component to communicate with. The selection is based in part upon position information including the directional heading of the aircraft, determined using a suitable position detecting system, such as a Global Positioning System or a multi-lateration system, and in part upon the loading (i.e., RF traffic) being experienced by each antenna array. Determining the optimal antenna array for the aircraft to communicate with based on the directional heading of the aircraft and the real time usage of each of the antenna substations is advantageous as it decreases the number of times that the aircraft must initiate a new connection with a new antenna substation, and therefore decreases the transmission interruptions experienced due to the creation of new connections.

10 Claims, 5 Drawing Sheets

SYSTEM AND METHOD FOR MANAGING COMMUNICATIONS WITH MOBILE PLATFORMS OPERATING WITHIN A PREDEFINED GEOGRAPHIC AREA

CROSS-REFERENCE TO RELATED APPLICATIONS

This application is a continuation-in-part of U.S. Ser. No. 10/655,923, filed Sep. 5, 2003, which claims priority from U.S. provisional application Ser. No. 60/409,335; filed Sep. 9, 2002, and from U.S. Ser. No. 60/408,846, filed Sep. 6, 2002.

FIELD

The present disclosure generally relates to systems and methods for managing the selection of wireless access points for mobile platforms traveling within a specified geographic area. More particularly the present disclosure relates to a system utilizing a centralized control system to monitor and recommend which one of a plurality of wireless access points should be used by mobile platforms operating in a plurality of independent geographic regions, to minimize the number of new communications links that each mobile platform has to establish during operation within its associated geographic region.

BACKGROUND

In conventional wireless network architectures, the radio frequency (RF) connections made between mobile platforms, such as aircraft, and particular RF communication access points disposed about a controlled area, such as at an airfield, is typically accomplished using microwave "line-of-sight" transmissions for modulating data between the aircraft and a ground-based control center in communication with the aircraft. Typically, frequencies in the range of about 2 GHz to about 6 GHz are employed for this purpose. Transmissions at such high frequencies facilitate extremely robust data transmission rates and provide excellent bandwidth for transmitting very large amounts of data very quickly between the aircraft and the ground-based control center. Such high frequency, line-of-sight transmissions are often handled in accordance with well known 802.11a or 802.11b/802.11g communications protocols, although are not necessarily limited to these protocols.

However, a drawback with the use of such high frequency RF transmissions is the limited distance over which such signals may be transmitted. Typically, this distance is about 1000 yards (910 meters) or less for such systems employed at airfields. Thus, when implementing a wireless, high frequency communications system at a controlled area such as an airport or airfield, where runways and taxiways may extend for significant distances and therefore define a relatively large, controlled area, a plurality of antenna substations must be employed. The antenna substations that are intended to communication with the aircraft as the aircraft taxis about the airfield, or is parked at various areas at the airfield for short or long periods, must be sufficient in number and strategically located at those areas around the airfield to ensure that communications can be maintained with an aircraft at all times during which the aircraft is present at the airfield.

With present day airfield traffic management systems the access to the antenna substations is also un-managed. By "un-managed", it is meant that the decision as to which antenna substation a particular aircraft should communicate which is based upon which antenna substation provides the strongest RF signal to the aircraft, as detected by the RF equipment carried by the aircraft. During situations where many aircraft are accessing the antenna substations simultaneously, this may result in some antenna substations being utilized to capacity while others with a similar coverage area are underutilized, thus leading to network bottlenecks and inefficiency in the communications with the aircraft operating at the airfield or airport. An underlying cause of this problem is the lack of knowledge about each aircraft's position, travel direction and speed, as well as a lack of consideration of the location, antenna type, orientation, and coverage area of the antenna substations.

An additional problem with un-managed, wireless communications systems for managing communications between aircraft and a ground based communications network stems from the transmission delay experienced when the network transfers an aircraft from one antenna substation to another at the airfield. Such delays are often experienced in signal strength based networks as such networks often transfer communications from one antenna substation to another due to the natural signal strength fluctuations experienced with RF transmissions. This can lead to frequent transfers of communication between the aircraft and various antenna substations at the airfield as the aircraft taxies about the airfield. This, in turn, can produce frequent delays in passing important data from the ground based network to the aircraft. With present day systems that rely on signal strength as the means for selecting a particular antenna substation to communicate with, natural signal strength fluctuations can result in the aircraft making and breaking RF connections many times in a very short time period, even while the aircraft is parked at an airfield. This is because with some existing systems at certain airports, an aircraft would be able to detect a beacon signal from several antenna substations simultaneously. The naturally varying signal strengths will prompt the RF communications system on the aircraft to repeatedly make and break communications links with various antenna substations in an effort to maintain communication with the substation providing the strongest beacon signal. Since each interruption in communication can represent a time period of one or more seconds, a large of amount of data transmitted to the aircraft can be lost each time an interruption in the communications link with an aircraft occurs.

Thus, there exists a need for an improved airport traffic management system that is capable of monitoring communications with a large number of aircraft on the ground at an airport and determining the optimal antenna substation to be used by each aircraft, in real time fashion, to even more efficiently manage communications between parked or taxing aircraft at an airport and a ground-based central data network. Specifically, there is a need for a communications system that is able to determine the optimal access point to be used by ground based aircraft, which is not limited to the consideration of the signal strength of received RF beacon signals by the aircraft's RF communications system. This would reduce the frequency of changes by the aircraft in the specific access point with which it is communicating, and therefore reduce the number of instances where communication is lost between the ground based aircraft and the central data network due to the initiation of a new communications link with a different access point. Further, there is a need for a communications system that can monitor and manage the number of aircraft that are communicating with a given access point at a given time to eliminate network bottlenecks and network inefficiencies.

Still another drawback with present day systems is the lack of "scalability" of such systems. Put differently, present day systems are often dedicated to a single airport. Thus, a completely separate control system must be configured at each airport, even if the airports are relatively close in distance to one another. Obviously, this creates significant expense and duplication. It would be highly advantageous if a centralized control system could be implemented that could manage the monitoring and selection of antenna substations for various aircraft at a plurality of independent airports, whether the airports are geographically close to each other or hundreds, or even thousands of miles apart. Such a centralized control system would allow scaling of the capability of the system to accommodate additional airports at a future date. Such a system would also eliminate the duplication of equipment and data that results from maintaining completely independent control systems at each airport that the system is used at.

SUMMARY

The present invention overcomes the deficiencies of the prior art by providing an improved communications system for use in a controlled environment, such as within an airfield, between a mobile platform, such as an aircraft, and a centralized ground communications network, such as an airport central data network located at an airport or airfield. Specifically, the present invention provides for a control computer that selects the optimal antenna substation for the aircraft to communicate with from a plurality of antenna substations located about the airfield. The decision as to which antenna substation to select may be based in part upon the directional heading of the aircraft that is determined using Global Positioning System (GPS) information from GPS satellites, and based in part upon the RF traffic being handled (i.e., loading) of each particular antenna substation. However, navigation information available from equipment carried on the aircraft, or any other source of navigation equipment, could be used to provide the needed position/heading information on the aircraft. Determining the optimal antenna substation for the aircraft to communicate with based on its current coordinates and the directional heading of the aircraft and upon the present usage of the different antenna substations is advantageous as it decreases the number of times that the aircraft must initiate a new connection with a different antenna substation. It also decreases the transmission interruptions experienced due to the initiation of new RF connections.

In an alternative preferred embodiment, the aircraft's position at an airfield at any given time is determined by multilateration techniques instead of by GPS information. Positional information concerning the aircraft is then used, together with additional information concerning the direction of travel of a moving aircraft and its speed, by a control computer to determine the appropriate access point for a given aircraft.

In still another alternative preferred embodiment, the system and method involves the use of a centralized control system that can manage the selection of antenna substations at a plurality of airports. The centralized control system is in communication with the aircraft operating at each airport via a wide area network and the specific antenna substation that a given aircraft is using. In one specific implementation, the centralized control system makes use of first and second access point control system (APCS) computers and at least one data base. In this implementation, the first APCS computer handles communications received from the aircraft, and the second APCS computer handles communications directed to the aircraft. The database is accessible by either one, or both, of the APCS computers, and is used for storing information relating to the identification of each aircraft accessing the system, the defined geographical coverage patterns associated with each of the antenna substations, the direction of travel of each aircraft, its speed of travel, the present load (i.e., communications traffic) being experienced by each antenna substation, and other information. In one specific implementation the database is a structured query language (SQL) database. The two APCS computers may also be configured to load share the communication responsibilities with the aircraft. This embodiment is readily scalable to handle additional airports and/or aircraft at each airport, as future needs dictate.

Further areas of applicability of the present invention will become apparent from the detailed description provided hereinafter. It should be understood that the detailed description and specific examples, are intended for purposes of illustration only and are not intended to limit the scope of the invention.

BRIEF DESCRIPTION OF THE DRAWINGS

The present disclosure will become more fully understood from the detailed description and the accompanying drawings, wherein:

FIG. 4 is simplified block diagram of an alternative embodiment of the present system and method that makes use of a centralized control system and a wide area network for simultaneously managing communications with aircraft operating at a plurality of different airports substantially in real time.

DETAILED DESCRIPTION

The following description of various embodiments is merely exemplary in nature and is in no way intended to limit the present disclosure, its application, or uses.

Figure 1:
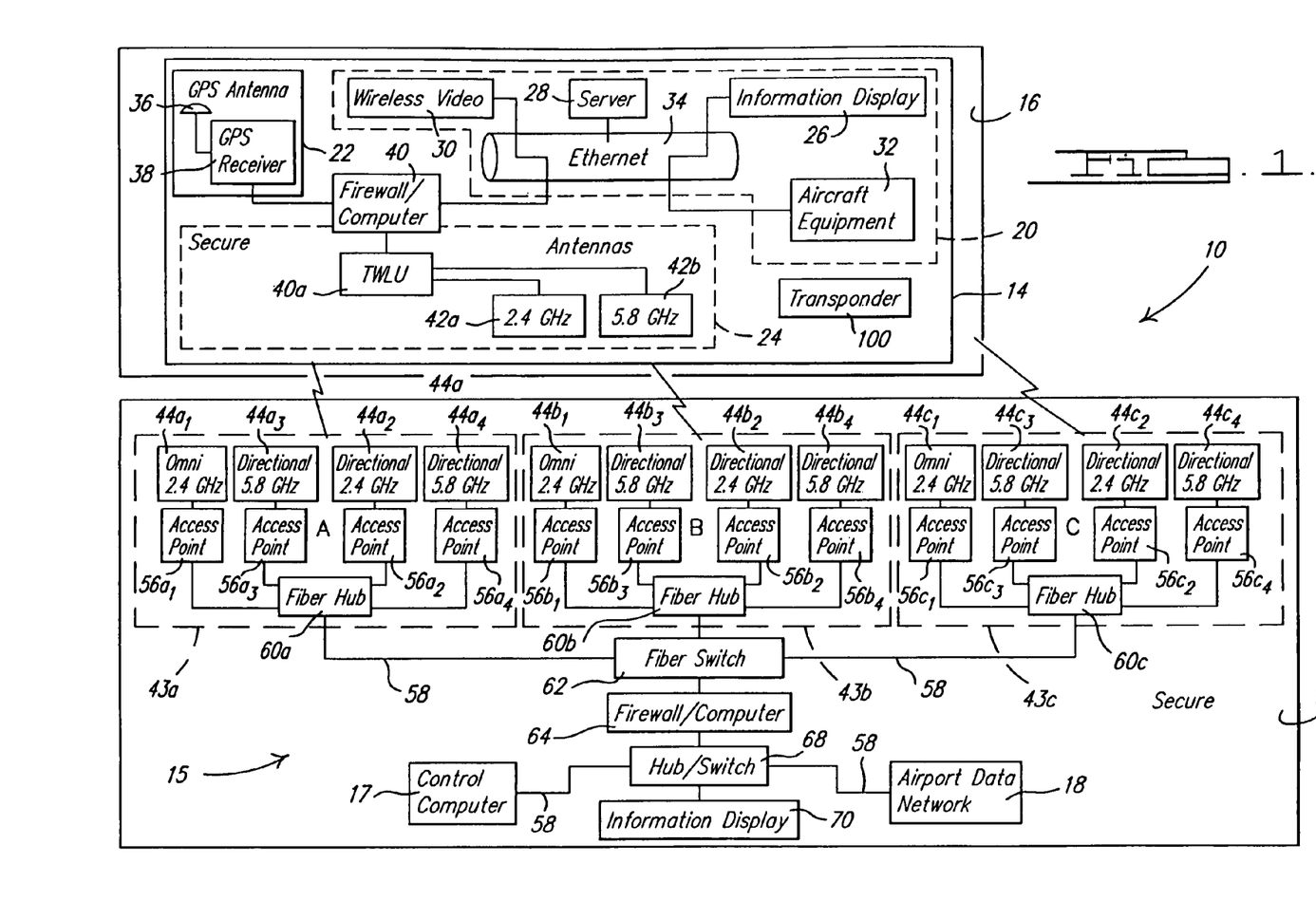
FIG. 1 is a block diagram generally illustrating a communications system of the present invention, and specifically illustrating an aircraft mobile component and a ground based component, and where the ground based component includes a plurality of antenna substations disposed about an airfield that are used to provide communication between the aircraft and a central data network.

With initial reference to FIG. 1, a communications system in accordance with one embodiment of the present system is generally illustrated at 10. The communications system 10 is used in a controlled environment such as at an airfield 12. The system 10 includes an aircraft communications mobile component 14 located onboard a mobile platform such as an aircraft 16 (FIG. 2), and a ground based component 15. The ground based component 15 includes a control computer 17. The ground based component 15 provides communication between the mobile component 14 and a remote data network 18, which may be part of the ground based component 15 or that may be a separate system accessed by the system 10. While the following description focuses on the application of communications system 10 to an airfield 12 with an aircraft mobile component 14 of an aircraft 16, it will be appreciated that the system 10 may be used in any controlled environment where a plurality of mobile platforms (e.g. motor vehicles, ships, etc.) need to simultaneously access a plurality of communications substations at a controlled area. Thus the description of the mobile platforms as aircraft 16 is only exemplary, and the present invention is not limited to use only with aircraft operating within the confines of an airfield.

The mobile component 14 will now be described in greater detail. The mobile component 14 is generally comprised of an aircraft data network 20, a device for determining the location and heading of the aircraft 16 such as a global positioning system (GPS) 22, and an antenna array 24. The aircraft data network 20 represents components that are pre-existing on each aircraft 16. The network 20 is comprised of an information display 26, a server 28, a video device 30 (possible as a wireless video device), and various other types of aircraft equipment 32. The different components of the data network 20 are interconnected through a local area network connection such as an Ethernet connection 34.

The GPS 22 determines the location and heading of the aircraft 16 through communication with navigation satellites (not shown) using GPS antenna 36. The navigation information received from the navigation satellites is received and processed by a GPS receiver 38.

The navigation information of the GPS 22 and the data from the aircraft data network 20 is prepared for transmission and encrypted by firewall/computer subsystem 40. The firewall/computer subsystem 40 may comprise any suitable computer system which includes an encryption device capable of encrypting data to allow the data to be transmitted with a suitable degree of security.

The antenna array 24 may comprise any suitable number and types of antennas, but in one preferred form is comprised of two separate antennas 42. The antennas 42 are interfaced to the firewall/computer subsystem 40 by a terminal wireless LAN unit (TWLU) 40A. It will be appreciated, however, that the mobile component 14 could incorporate only a single antenna. Providing a plurality of antennas 42, however, provides added flexibility to the system 10.

The antennas 42 include a 2.4 GHz antenna 42a, and a 5.8 GHz antenna 42b. Antennas 42a and 42b are located on the crown of the exterior of the aircraft 16 The use of antennas for operating at two different frequency bands further ensures that if traffic on one band is very high, that a second band is available for use.

The antenna array 24 transmits the encrypted data of the GPS 22 from the mobile component 14 to the control computer 18 by way of a series of antenna substations 43a, 43b and 43c. Each antenna substation 43 includes an antenna array 44 that is located at a predetermined location at the airfield 12. The encrypted data may be transmitted in a variety of different formats but is preferably transmitted using well known 802.11a, 802.11b, or 802.11g protocols. The data from the aircraft data network 20 may also be transferred via antenna array 24, however, the transmission of data from the aircraft data network 20 is not the principal purpose for the system and method.

Figure 2:
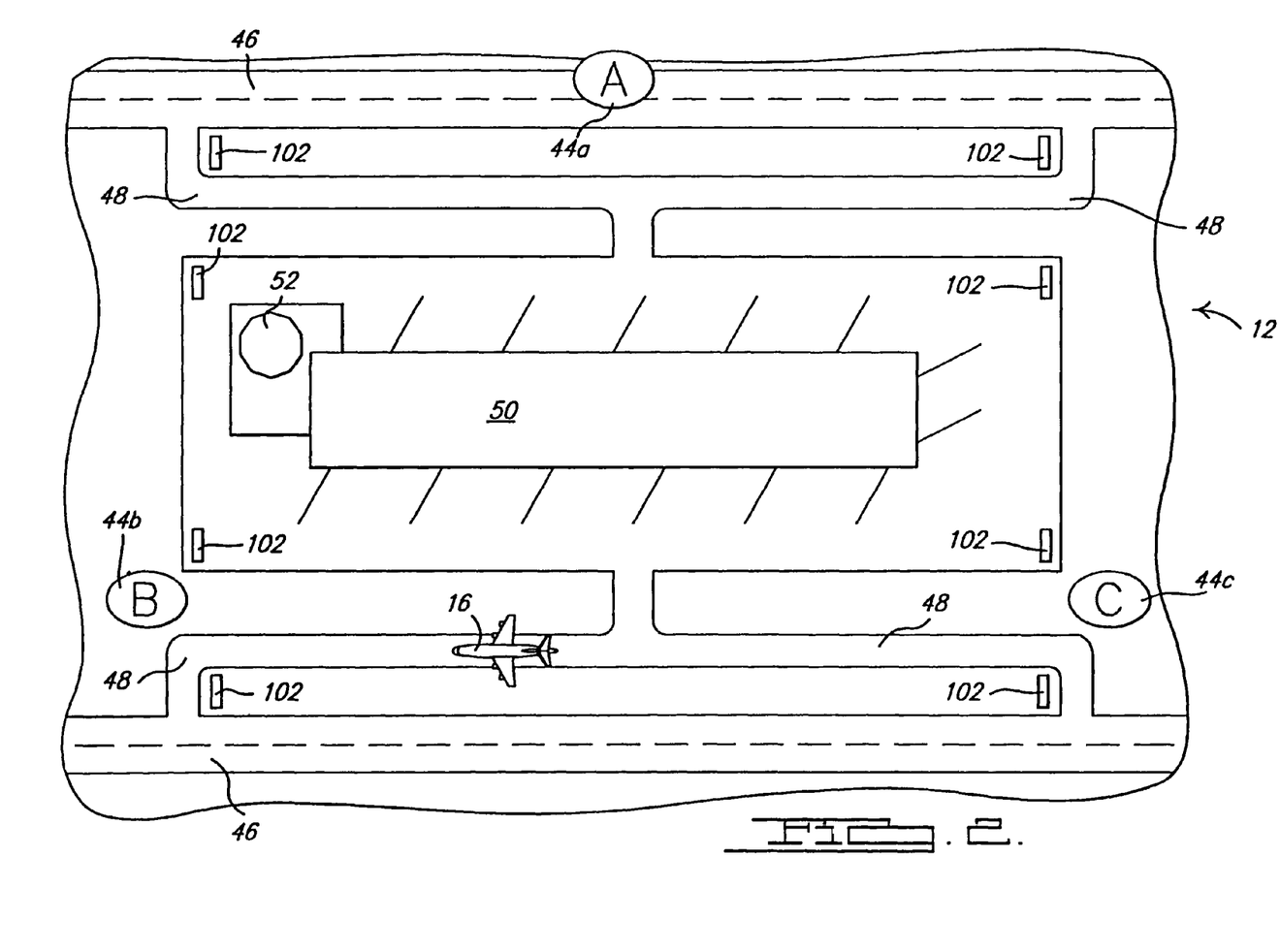
FIG. 2 is a top view of a portion of an airfield at which the communications system of FIG. 1 may be used.

In FIG. 2, the antenna substations 43 are illustrated at various predetermined locations at the airfield 12. The airfield 12 is comprised of at least one runway 46, at least one taxiway 48, a terminal 50, and a control tower 52. While FIGS. 1 and 2 illustrate three antenna substations 43a, 43b, and 43c, it must be realized that any suitable plurality of antenna substations 43 may be incorporated. The antenna substations 43 are located about the airfield 12 at those locations sufficient to provide communication with an aircraft at any area where the aircraft 16 might be required to taxi or might be parked.

All of the antenna substations 43 transmit a "beacon" signal from their respective antenna array 44 that identifies the source of the beacon signal and an SSID (Service Set Identification), which is a unique identifier exclusive to the system 10. Antenna arrays 44 in close proximity are on different frequencies to further help prevent self jamming. The aircraft data network 20 knows the SSID and scans the frequencies associated with the antenna arrays 44 looking for a beacon signal. If it detects only one, then it will commence communications at that frequency and with that particular antenna array 44 associated with the received beacon signal. If it detects more that one beacon signal, then the signal having a stronger received signal strength will be selected and locked onto by the aircraft data network 20.

As seen in FIG. 1, each antenna array 44a, 44b and 44c is preferably comprised of at least four antennas. Antenna array 44a includes an omnidirectional antenna $44a_1$ tuned to 2.4 GHz, a 2.4 GHz directional antenna $44a_2$, and two 5.8 GHz directional antennas $44a_3$ and $44a_4$. Antenna arrays 44b and 44c similarly include antennas $44b_1$-$44b_4$ and $44c_1$-$44c_4$, respectively. Each antenna of each antenna array 44 is coupled to one of a plurality of access points 56. Thus, antennas $44a_1$-$44a_4$ are coupled to access points $56a_1$-$56a_4$. Antennas $44b_1$-$44b_4$ are similarly coupled to access points $56b_1$-$56b_4$, and antennas $44c_1$-$44c_4$ are similarly coupled to access points $56c_1$-$56c_4$. The access points 56 form transceivers that convert the received electromagnetic (EM) wave data to electrical signals suitable for transmission through a land-based transmission line. Preferably, the received data is converted to a suitable IP protocol to permit transmission through fiber optic lines 58.

The directional antennas $44a_2$-$44a_4$, $44b_2$-$44b_4$ and $44c_2$-$44c_4$ are used to beam EM wave signals down the runway 46 and taxiway 48. Accordingly, the various ones of these directional antennas are orientated so that their beams are directed away from each other, and more preferably such that the antennas of array 44a transmit beams at 180 degrees from one another (i.e., in opposite directions) along runway 46. The directional antennas of arrays 44b and 44c are similarly positioned to cover the full length of taxiway 48. The omnidirectional antenna $44a_1$, $44b_1$ and $44c_1$ of each antenna array 44 is used to serve areas not covered by its associated directional antennas. The use of directional antennas $44a_2$-$44a_4$, $44b_2$-$44b_4$ and $44c_2$-$44c_4$ provide greater range and help to reduce self jamming. Self jamming is reduced because the RF signal from one of the directional antennas $44a_2$-$44a_4$, $44b_2$-$44b_4$ and $44c_2$-$44c_4$ is reduced in level when received by the other one of the adjacent directional antennas. This is because of the signal rejection characteristics of each of the directional antennas. This effectively improves the signal-to-jamming margin of each directional antenna.

Each antenna of antenna arrays 44a, 44b and 44c is in communication with an associated fiber hub 60a, 60b and 60c. The fiber hubs 60 are in turn coupled to a fiber switch 62. The data received by fiber switch 62 is de-crypted by any suitable data de-crypting device, such as a firewall/computer subsystem 64. The data is transferred to and from firewall/computer subsystem 64 preferably using fiber optic lines 58. Firewall/computer subsystem 64 also performs an authentication of each aircraft 16 accessing the ground based component 15 to thus control access by the aircraft to the system 10. It will be appreciated that while fiber optics are utilized to handle the transmission of data between the antenna substations 43 and the fiber switch 62, that other suitable data transmission means could be incorporated in lieu of a fiber optic system.

From the firewall/computer subsystem 64, the received data is directed to various subsystems by a hub or switch 68. The subsystems in receipt of the received data preferably include the control computer 17, the airport data network 18, and an information display 70 for visually displaying various operational parameters of the system 10, such as the location and heading of the aircraft 16 and which antenna array 44 the aircraft 16 is in communication with. While the control computer 17 is illustrated as being separate from the airport data network 18, it should be realized that the control computer 17 may be part of the airport data network 18. The control computer 17, information display 70, and airport data network 18 are interconnected by fiber optic lines 58 or any other suitable signal transmission means.

Figure 3:
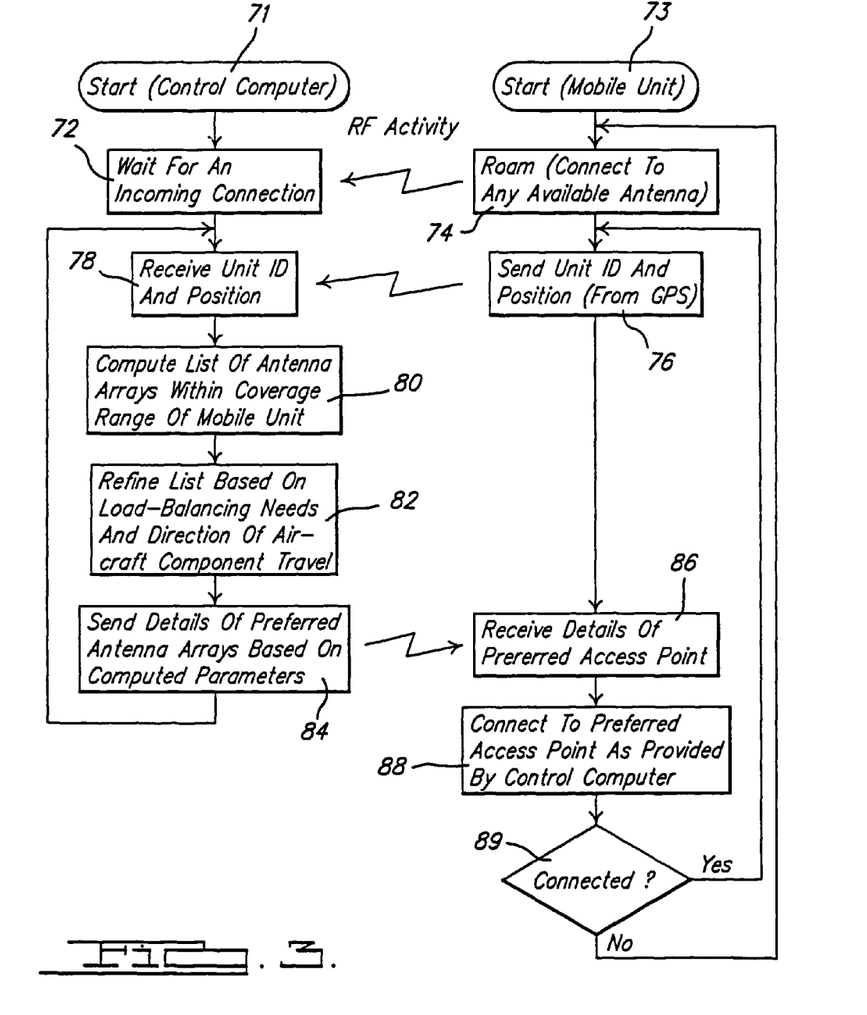
FIG. 3 is a flow chart-like illustration of the communication operation performed by a control computer and the aircraft mobile component of FIG. 1, and the interaction between the control computer and the aircraft component in establishing a communications link.

The decision as to which antenna substation 43 aircraft mobile component 14 is to connect with in order to communicate with the airport data network 18 is made by control computer 17. The use of control computer 17 to determine which antenna substation 43 the mobile component 14 is to communicate with will now be described in detail. As illustrated in FIG. 3, the control computer 17 is activated at operation 71 and waits to receive an incoming data signal from mobile component 14 of a given aircraft 16, as shown at operation 72. Once aircraft communications component 14 is activated at operation 73, the mobile component 14 performs a roaming operation at operation 74 to detect a beacon signal from any one of the antenna arrays 44a,44b,44c. Once it detects such a signal it establishes a communications link with the antenna substation 43a, 43b,43c providing the beacon signal, and then makes a connection with the control computer 17, as shown at operation 72.

After the mobile component 14 connects with one of the antenna arrays 44a,44b,44c, it transmits a unit identification number (e.g., a tail number) and its position, as determined by GPS 22, to the control computer 17, at operation 76. Alternatively, multi-lateration could be used in place of a GPS system to determine the position of the aircraft 16. This position detecting technique will be discussed in connection with an alternative preferred embodiment of the present system and method.

The unit identification number and position data are received by the control computer at operation 78. Once the control computer 17 receives the identification number and position data at operation 78, and authenticates the aircraft 16 as an aircraft authorized to access the system 10, the control computer 17 computes a list of antenna arrays 44 that are within the coverage range of the mobile component 14, as at operation 80. The list of antenna arrays 44 that is generated by the control computer 17 is modified at operation 82 based on antenna array load balancing considerations and the direction of travel of the aircraft 16 to determine the optimal antenna array 44 with which aircraft 16 is to communicate with. For example, FIG. 2 illustrates aircraft 16 as being closest to antenna array 44b. However, if antenna array 44a is presently operating at capacity with respect to the number of aircraft it is in communication with, then the control computer 17 will select a different antenna array 44 which represents the next optimal antenna array. Further, if the aircraft 16 is closest to antenna array 44b but the data from the GPS 22 indicates that the aircraft 16 is traveling away from the antenna array 44b of antenna substation 43b and toward the antenna array 44c of substation 43c, the control computer 17 will select antenna array 44c as the optimal antenna array 44 for the aircraft component 14 to communicate with. This is done to minimize the number of times that the mobile component 14 must initiate a new connection with antenna arrays 44 as the aircraft traverses the airfield 12, and thus minimize the communication delays associated with establishing new communications links.

Once the optimal antenna array 44 is selected by control computer 17, the details of the optimal antenna array 44 are transmitted to the mobile component 14 at operation 84 and received by the mobile component 14 at operation 86. The mobile component 14 connects to the optimal antenna array 44 as indicated at operation 88. If the mobile component 14 successfully connects to the antenna array 44 selected by the control computer 17 at operation 89, the operation of the mobile component 14 proceeds to operation 76. At this operation the unit identification number and the heading of aircraft 16 are again transmitted to the control computer 17 to allow the control computer 17 to continuously update its decision as to which antenna array 44 is the optimal antenna array for the aircraft 16 to communicate with. If the mobile component 14 is unable to connect to the preferred antenna array 44 at operation 89 the operation of the mobile component 14 proceeds to operation 74 where the mobile component 14 of the aircraft 16 connects with any available antenna array 44 until the component 14 is able to connect to the optimal antenna array 44 as selected by control computer 17.

An additional advantage to using "sectorized" (i.e., spaced apart) antennas is that it allows a system to be designed with a near optimum frequency plan incorporating frequency reuse. Since omnidirectional antennas transmit in all directions, a frequency can be reused at a different antenna station only if the distance between the omnidirectional antennas is great enough to avoid interference. Sectored antennas restrict the RF pattern, so frequency reuse in close proximity is possible as long as it is in a sector that does not overlap with a sector on the same frequency.

Figure 3A:
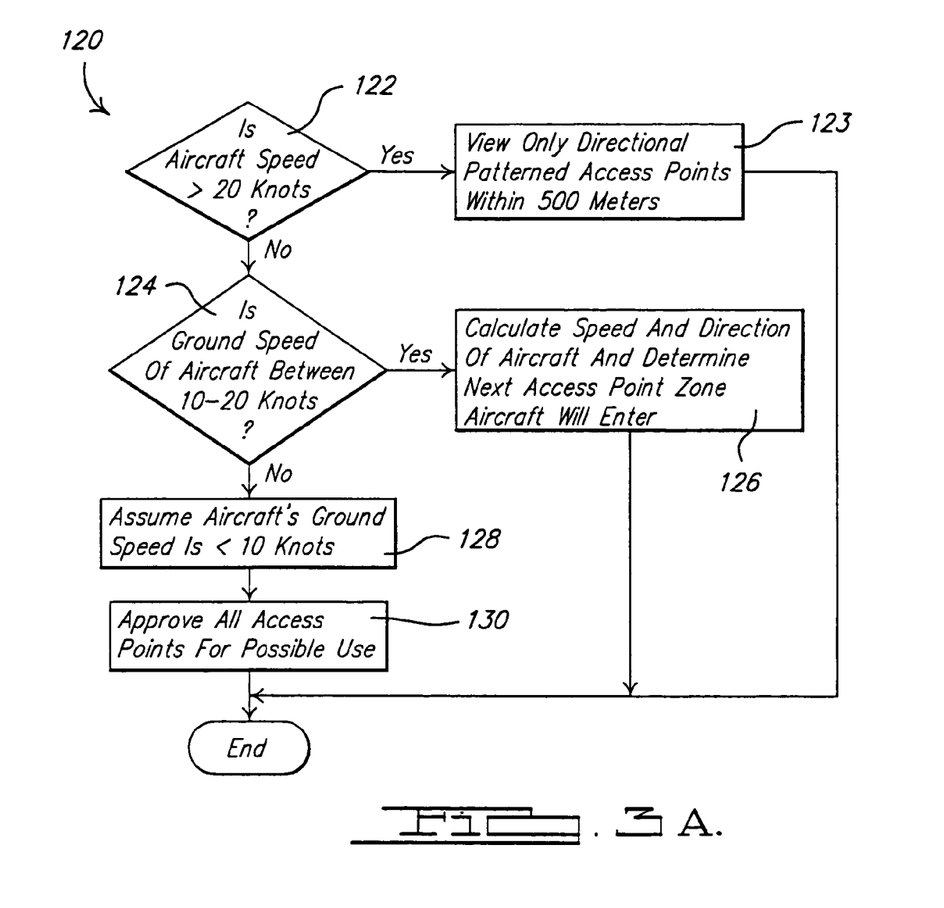
FIG. 3a is a flowchart further illustrating the decisions made in determining which access point zones are to be used by an aircraft.
Figure 5:
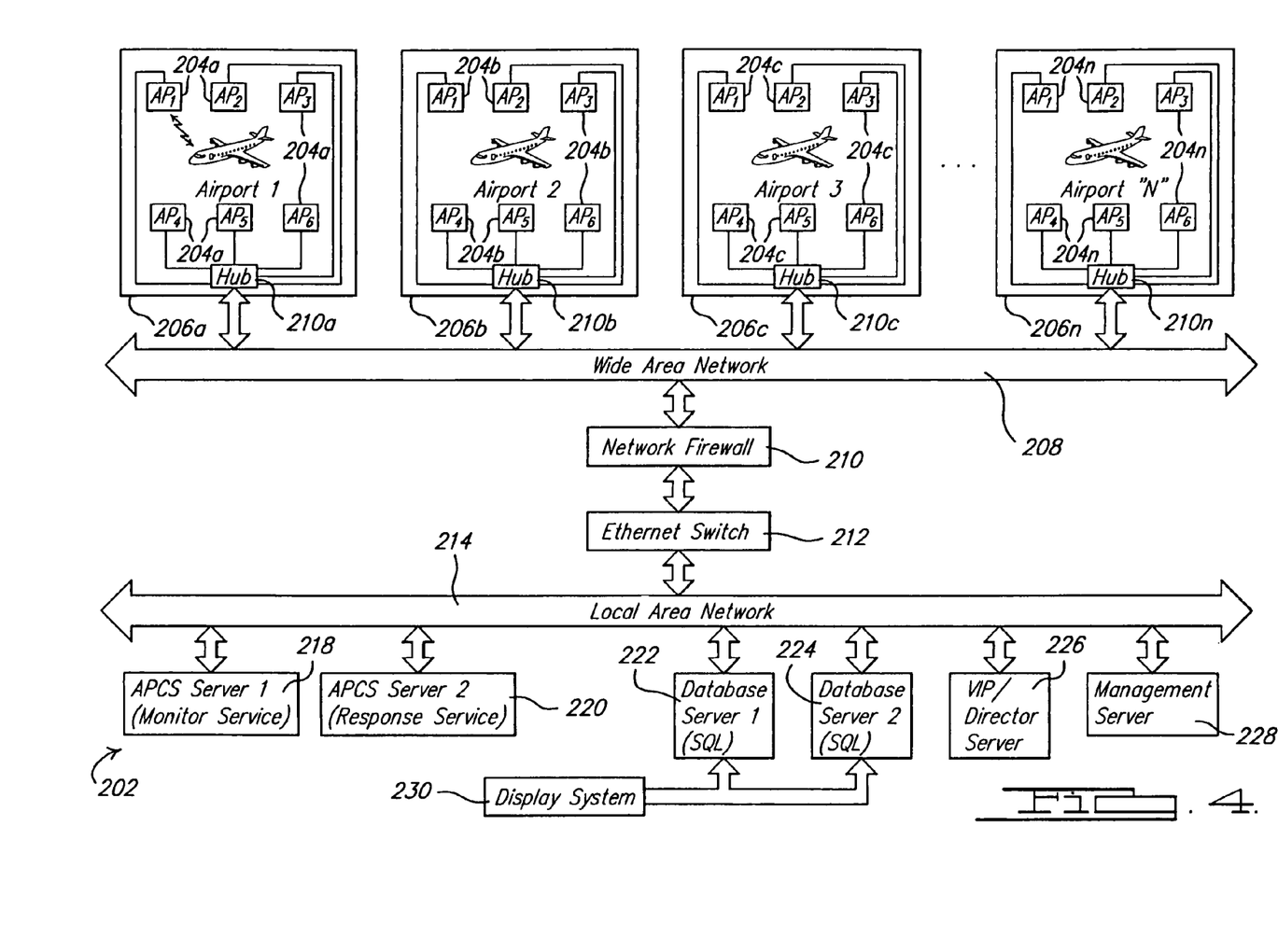

Referring briefly to FIG. 3A, a flowchart 120 of the basic operations performed by the control computer 17 in determining a specific access point 56 is presented. At operation 122, a determination is made if the speed of the aircraft 16 is greater than about, for example, 20 knots. If the answer to this inquiry is "yes", then only directional patterned access points 56 within about 500 meters from the current position of the aircraft are viewed, and only the directional antennas are used, as indicated at operation 123. If the answer to the previous inquiry is "no", then a check is made if the ground speed of the aircraft 16 is between about 10-20 knots, as indicated at operation 124. If the answer to this inquiry is "yes", then the speed of the aircraft 16 is calculated, as well as its direction, and the next access point 56 zone that the aircraft will enter is determined, as indicated at operation 126. Decisions as to exactly which access point 56 in the newly determined zone of access points can be made on a static profile of conditions or variables (e.g., the current traffic being experienced by each of the access points). If the inquiry at operation 124 is "no", then it is assumed that the aircraft's 16 speed is 10 knots or less, as indicated at operation 128. All access points 56 in any approved sector of the airfield 12 are approved for possible use by the aircraft 16, as indicated at operation 130. It will be appreciated that the aircraft 16 speeds that the control computer 17 considers, as given above, can be modified to be greater or lesser than the ranges given.

As the differential number of active clients increase in one primary access point 56 zone, the acceptable signal-to-noise ratio for switching to a secondary access point 56 zone will be lowered proportionally to the total number active clients (i.e., aircraft 16) in the given access point zone. For example, if three aircraft are operating in a given access point zone, the signal-to-noise ratio (SNR) of a secondary access point zone may be set equal to or greater than X. If four aircraft are operating in the same access point zone, the secondary access point zone SNR may be set equal to or greater than "X−1"; if five aircraft are operating in a given access point zone, the secondary zone SNR may be set equal to or less than "X−3"; and if six aircraft are operating in a given access point zone, the secondary zone SNR may be set equal to X−5, and so on. This scheme also helps load balancing between the access point antennas 44.

In an alternative embodiment, the technique of multi-lateration is used to provide the needed positional information of each aircraft 16 located at an airfield. In this embodiment, the aircraft 16 includes an RF transponder 100 as part of its mobile component 14, as shown in FIG. 1. It will be appreciated that when multi-lateration is used, the GPS subsystem 22 will not be required.

Briefly, and with reference to FIG. 2, multi-lateration is a well known technique involving the use of multiple, non-rotating RF receivers 102 disposed at various locations about the airfield 16. The RF receivers 102 are used to capture pulses being transmitted from the RF transponder 100 of each aircraft 16. From these pulses, an external processing system associated with the RF receivers 102 extrapolates the position of the aircraft 16 at any given instant. Multi-lateration differs from a GPS based system because a GPS based system uses a single receiver (i.e., on the aircraft 16) to capture signals transmitted from a plurality of widely spaced satellites. One manufacturer of a multi-lateration system suitable for use with the present invention is Senesis Corporation of DeWitt, N.Y. The receivers 102 could be located at the antenna substations 15 or at other areas about the airfield 12. Since they are physically small components, they are easily mounted on other support structures or pre-existing buildings at the airfield 12. The resolution of the position information extrapolated from the receivers 102 is limited principally by the number of receivers 102 employed. Accordingly, the greater the number of receivers 102 located about the airfield 12 the greater the precision with which each aircraft's 16 location can be pinpointed at any given time.

Thus, the present system and method relates to an improved communications system 10 for providing communications in a controlled environment, such as within the airfield 12, between a mobile unit, such as the aircraft mobile component 14 of aircraft 16, and a remote network, such as the airport data network 18. Specifically, the present system and method provides for a control computer 17 that selects the optimal antenna substation 43 from a plurality of antenna substations disposed about an airfield for the aircraft 16 to communicate with. This determination is based in part upon the position, direction of travel and speed of the aircraft 16, calculated using suitable position information, and in part upon the current load (i.e., number of aircraft) being handled by each antenna substation 43. Determining the optimal antenna substation 43 for aircraft component 14 to communicate with based on the directional heading of the aircraft 16 and the real time usage of each antenna substation 43 is advantageous as it decreases the number of times that aircraft communications component 14 must initiate communication with a new antenna array 44, and thus decreases the transmission interruptions experienced due to the creation of new connections.

Referring to FIG. 4, a system 200 in accordance with an alternative preferred embodiment of the present disclosure is presented. The system 200 incorporates a centralized control system 202 that communicates with a plurality of access points 204a, 204b, 204c, 204n at a plurality of airports 206a, 206b, 206c, 206n. Communication is by a wide area network 208, for example the Internet.

In FIG. 4, for simplicity each access point 204 is shown as a single element, but it will be understood that each access point 204 is meant to represent a plurality of directional and omnidirectional antennas, each forming its own dedicated wireless access point, as described herein in connection with FIG. 1. Thus, for example, each of access points 204a may include one or more directional antennas and one or more omnidirectional antennas. Each access point 204 is coupled by an associated hub 210a, 210b, 210c or 210n to the wide area network 208. The wide area network 208 communicates with the centralized control system 202 via a network firewall 210, an Ethernet switch 212 and a local area network 214.

The centralized control system 202 includes a first access point control (APCS) computer 218, a second APCS computer 220, a first database 222, a second database 224, a VIP/Director server 226 and a management server 228. Optionally, at least one display system 230, for example a CRT or LCD flat panel system, could be used to display information being processed by the system 200. The first and second databases 222 and 224 are each preferably "structured query language" (SQL) databases that store identification information (e.g., tail number) for each aircraft 16 accessing the system 200, position information reported by each aircraft, real time speed information for each aircraft, access point configuration maps of the number and location of each access point 204 at each airport, as well as any other pertinent information that may be helpful to the system 200 in determining the optimum access point for a given aircraft 16 to communicate with at a given time.

The first APCS computer 218 is configured to perform a "monitor" service to monitor all communications received from each aircraft 16 operating at each airport 206 and to write any pertinent information received (e.g., identification information) from the aircraft to one or both of the SQL databases servers 222,224. The second APCS 220 is dedicated to processing information stored in one or both of the SQL databases 222,224 and sending communications as to which specific access point 204 to use, to each aircraft 16. The second APCS 220 constantly scans its associated SQL database server 224 (or possibly both servers 222,224), looking for an aircraft 16 that is requesting an updated list of preferred access points 204. Each of the SQL database servers 222,224 may be built on either a Microsoft Windows® platform or a Linux® platform. The operating system and protocol preferably provides User Datagram Protocol (UDP)/IP protocol to each communications component 14 and TCP/IP connectivity between the APCS computers 218, 220 and the SQL database servers 222,224.

Each SQL database server 222,224 may include a complete copy of the information stored in the other, which provides a level of redundancy in the event of a failure of either one of the database servers. Alternatively, the first SQL database may be assigned to handle information pertaining to aircraft operating a first plurality of airports, while the other SQL database server is assigned to handle information relating to a different plurality of airports. Suitable load sharing software could also be implemented to monitor the access to each SQL database 222,224 and to modify access to each to better balance the load being experienced by each SQL database server. Similar load balancing could also be implemented with the APCS computers 218,220, provided each computer was configured to handle both monitoring and response operations. Such a configuration may be preferable in applications involving smaller airports, or where only a limited number of aircraft are being handled at a small number of airports. However, at major airports across the world, it is anticipated that the more preferable arrangement will be to dedicate each APCS computer 218,220 to performing either a monitoring function or a response function.

The response APCS computer 220 is configured to access one of SQL databases, for example SQL database 224, and to use the information stored by it to perform the needed calculations to determine a specific access point, or preferred listing of access points, and to communicate this information back to a specific aircraft 16. For example, APCS computer 220 may determine that access points AP3, AP2 and AP6 at airport 206a are the most desirable (with AP3 being the best) access points for establishing communications with a given aircraft that has logged into the system 200.

The VIP/Director server 226 is optional, but if included can be used to intercept data destined for the monitor APCS computer 218 and to monitor the communications load (i.e., traffic) being experienced by the APCS computer 218. If the APCS computers 218,220 are each configured to be able to both monitor and respond to the mobile components 14 accessing the system 200, then the VIP/Director server 226 can implement load sharing between the two APCS computers 218, 220 to ensure that neither computer 218,220 is overburdened with communications traffic. The Management server 228 is only used at boot time to configure the SQL/database servers 218, 220.

The communications protocol used between the aircraft communications component 14 on each aircraft 16 and the system 200 may vary, but in one form is based on the National Marine Electronics Association Standard 0183. Data communications between the mobile component 14 on each aircraft 16 and the APCS computers 218, 220 are all preferably in sentence form. Several specific types of sentences may be employed as follows:

General Sentence Format

All data messages are transmitted in the form of sentences. Only printable ASCII characters are used, plus CR (carriage return) and LF (line feed). Each sentence starts with a "$" and ends with <CR><LF>.

The first five to seven characters following the "$" are the sentence identifier. The sentence identifier defines the content and format for the remainder of the message. The sentence identifier is separated from the rest of the message with a comma. This is followed by a number of data fields separated by commas, a checksum, and a terminating carriage return and line feed.

A sentence may contain up to 120 characters plus "$" and <CR><LF>. If data for a field is not available, the field is blank, but the delimiting commas are present, with no space between them. The checksum field is comprised of a "*" and two hexadecimal digits representing the Exclusive-OR of all characters between, but not including, the "$" and "*".

The entire message is an ASCII string, but some fields represent numeric values.

Float fields are an ASCII representation of a floating-point number. The decimal point is optional and may appear anywhere in the float field. This type of field may contain any numeric character from 0 to 9. In addition, the minus sign, plus sign, and decimal point may be present in this field. If the minus sign or plus sign is included, it must be the first character of the field. If the field contains any other characters, its value is indeterminate and ignored.

Fixed fields are an ASCII representation of an integer. This type of field may contain any numeric character from 0 to 9. In addition, the minus sign, and plus sign may be present in this field. If the minus sign or plus sign is included, it must be the first character of the field. If the field contains any other characters, its value is indeterminate and ignored.

The Float and Fixed fields may represent either positive or negative numbers. The field represents a negative number when the minus sign is the first character in the field. The field represents a positive number in the absence of the minus sign or the presents of the plus sign.

The Float and Fixed fields are decimal representations, except for the checksum field, which represents a hexadecimal value.

Text fields must contain only printable ASCII characters.

Text fields that represent an access point MAC (media access control) address are formatted as six pairs of hexadecimal digits separated by colons and are case insensitive.

Text fields that represent UTC time (coordinated universal time) are formatted as two digits of hours, two digits of minutes and two digits of seconds. Optionally, this may be followed a decimal point and up to two digits of fractional seconds.

Text fields that represent a date are formatted as two digits of day, two digits of month, and two digits of year.

The sentence identifier and vehicle identifier text fields are case sensitive. All other text fields are case insensitive unless noted otherwise.

Location Sentence

A location sentence (PNAVL) is transmitted from each aircraft periodically to the system 200. It contains the vehicle identifier, location, and motion information for the aircraft plus a MAC (Media Access Control) address and channel for the currently associated access point 204.

Message Template

An exemplary message template is as follows:
$PNAVL,b,c.c,d,e.e,f,g.g,h.h,i,j.j,kk,ll,mm:mm:mm:mm:mm:m m,n.n,o.o,p*zz<CR><LF>

Field Description Table (for Message Template)

| Field ID | Description | Data Type | Character Limit |
|---|---|---|---|
| b | Vehicle Identifier/Tail Number | Text | 20 |
| c | GPS Latitude (NMEA format) | Float | 10 |
| d | GPS Latitude Direction (N = North or S = South) | Text | 1 |
| e | GPS Longitude (NMEA format) | Float | 10 |
| f | GPS Longitude Direction (E = East or W = West) | Text | 1 |
| g | GPS Heading (NMEA format) | Float | 6 |
| h | GPS Speed (NMEA format) | Float | 6 |
| i | GPS Validity (1 = Valid Data or 0 = Invalid Data) | Fixed | 1 |
| j | GPS Time (NMEA format) | Text | 9 |
| k | GPS Date (NMEA format) | Text | 6 |
| l | AP Frequency (kHz) | Fixed | 7 |
| m | AP MAC Address (Hex) | Text | 17 |
| n | AP Signal Level (dBm) | Float | 6 |
| o | AP Noise Level (dBm) | Float | 6 |
| p | Command Port Number | Fixed | 5 |
| z | Checksum (Hex) | Fixed | 2 |

Example

One specific exemplary message is as follows:
$PNAVL,N747ER,3840.3052,N,09038.3471,W,204.99, 21.3,1, 231241.55,060905,2412000,00:60:B0:A3:CA:50,-80,-95,4040*3b<CR><LF>

This message is from a mobile component 14 on an aircraft 16 identified with the tail number of N747ER. This aircraft 16 is positioned at 38° 40.3052° North latitude by 90° 38.3471° West longitude. The aircraft 16 is on a heading of 204.99° and moving at 21.3 Knots. The positional data is marked as valid at the current time, 23 hours, 12 minutes, and 41.55 seconds. The current date is the 6 Sep. 2005. The TWLU (Terminal Wireless LAN Unit) 40*a* (FIG. 1) is currently tuned to 2.412 GHz and is associated with the access point 204 that is reporting a MAC address of 00:60:B0:A3:CA:50. The received signal level is −80 dBm and the noise level is −95 dBm. The mobile component 14 of the aircraft 16 is listening for commands and acknowledgements on port 4040.

Configuration and Version Sentence (PNAVC)
General Description

This sentence is sent from the mobile component 14 of the aircraft 16 to the monitoring APCS 218 during the initial contact with the APCS 218. The response APCS 220 may also request this sentence at any time. It contains the version numbers for the APCS/mobile component protocol and mobile component application. This sentence will be sent periodically until at least one PNAVC acknowledgement message is received by the mobile component 14 of the aircraft 16.

Message Template
An exemplary message template is as follows:
$PNAVC,b,c.c,d.d,e*zz<CR><LF>
Field Description Table

| Field ID | Description | Data Type | Character Limit |
|---|---|---|---|
| b | Vehicle Identifier/Tail Number | Text | 20 |
| c | Protocol Version | Float | 6 |
| d | COMMUNICATIONS COMPONENT 14 Version | Float | 6 |
| e | Command Port Number | Fixed | 5 |
| z | Checksum (Hex) | Fixed | 2 |

Example

A specific, exemplary message is as follows:
$PNAVC,N747ER,1.5,1.22,4040*12<CR><LF>

This message is from a mobile component 14 on an aircraft 16 identified with the tail number of N747ER. The mobile component 14 is currently using version 1.5 of the APCS/mobile component protocol and the revision level for the mobile component application is 1.22. The mobile component 14 is listening for commands and acknowledgements on port 4040.

Tunable Frequency List Sentence (PNAVFx)
General Description

This message is sent from the aircraft communications component 14 to the APCS computer 218 during the initial contact with the APCS computer 218. The APCS computer 220 may also request this sentence at any time from a given aircraft 16. It contains the tuning capabilities of the TWLU 40*a* in the form of a frequency list and the size of the list. Due to the variable length of the frequency list, this may be a multi-sentence message. Each sub-part is transmitted as an independent sentence and can contain up to ten frequencies. The sentence identifier for each sub-part is unique and each will be individually acknowledged. The sentence identifier for the first sub-part is PNAVF0. The next would be PNAVF1, then PNAVF2, and so on, until the entire frequency list has been transmitted. Each sub-part will be periodically re-transmitted until its acknowledgement is received by the mobile component 14. Subsequent sub-parts will not be transmitted until the current sub-part is acknowledged. Acknowledgements for other than the current PNAVFx sub-part will be ignored.

Message Template
One exemplary message template is as follows:
$PNAVFx,b,c,d,e,f,g,h,i,j,k,l,m,n*zz<CR><LF>
Field Description Table

| Field ID | Description | Data Type | Character Limit |
|---|---|---|---|
| b | Vehicle Identifier/Tail Number | Text | 20 |
| c | Total Number of Tunable Frequencies | Fixed | 3 |
| d | Frequency 0 (kHz) | Fixed | 7 |
| e | Frequency 1 (kHz) | Fixed | 7 |
| f | Frequency 2 (kHz) | Fixed | 7 |
| g | Frequency 3 (kHz) | Fixed | 7 |
| h | Frequency 4 (kHz) | Fixed | 7 |
| i | Frequency 5 (kHz) | Fixed | 7 |
| j | Frequency 6 (kHz) | Fixed | 7 |
| k | Frequency 7 (kHz) | Fixed | 7 |
| I | Frequency 8 (kHz) | Fixed | 7 |
| m | Frequency 9 (kHz) | Fixed | 7 |
| n | Command Port Number | Fixed | 5 |
| z | Checksum (Hex) | Fixed | 2 |

Example

One exemplary message is as follows:
$PNAVF0,N747ER,19,2412000,2417000,2422000, 2427000, 2432000,2437000,2442000,2447000,2452000, 2457000,4040*33<CR><LF>$PNAVF1,N747ER,19, 2462000,5180000,5200000,5220000,5240000,526000 0,5280000,5300000,5320000,,4040*04<CR><LF>

This PNAVF message is comprised of two sub-sentences, PNAVF0 and PNAVF1. These messages are from a mobile component 14 on an aircraft 16 identified with the tail number of N747ER. The mobile component 14 is capable of tuning the 19 channels that correspond to the ten frequencies from the PNAVF0 sentence and the nine frequencies from the PNAVF1 sentence. The communications component 14 is listening for commands and acknowledgements on port 4040.

Access Point Selection Sentence (PNAVA)
General Description

This sentence may be sent from the response APCS 220 to the mobile component 14 at any time. This message defines 0 to 3 preferred access points with which the mobile component 14 should attempt association. This message may contain a confirmation of the currently preferred access points 204 or it may contain an updated list of access points. If only one access point 204 is specified, it must be defined in the primary fields. If two are specified, they must occupy the primary and secondary fields. If none are specified, the mobile component 14 is free to roam and associate with any access point 204 at the airport at which its aircraft 16 is operating.

Message Template
One exemplary message template is as follows:
$PNAVA,b,c,dd:dd:dd:dd:dd:dd,e,ff:ff:ff:ff:ff:ff,g,hh:hh:hh:h h:hh:hh*zz<CR><LF>
Field Description Table

| Field ID | Description | Data Type | Character Limit |
|---|---|---|---|
| b | Vehicle Identifier/Tail Number | Text | 20 |
| c | Primary AP Frequency (kHz) | Fixed | 7 |
| d | Primary AP MAC Address (Hex) | Text | 17 |
| e | Secondary AP Frequency (kHz) | Fixed | 7 |
| f | Secondary AP MAC Address (Hex) | Text | 17 |

-continued

| Field ID | Description | Data Type | Character Limit |
|---|---|---|---|
| g | Tertiary AP Frequency (kHz) | Fixed | 7 |
| h | Tertiary AP MAC Address (Hex) | Text | 17 |
| z | Checksum (Hex) | Fixed | 2 |

Example

One specific, exemplary message is as follows:
$PNAVA,N747ER,2457000,00:60:B0:A3:CA:50, 5300000,00: 60:B0:45:93:02,,*77<CR><LF>

This message instructs the mobile component 14, on aircraft 16 identified by N747ER, to attempt an association with the primary access point 204 which has a MAC address of 36,00:60:B0:A3:CA:50 and is operating at 2.457 GHz. If that association can't be made or doesn't provide a stable connection to the APCS computer 218, then the mobile component 14 should attempt an association with the secondary access point which has a MAC address of 00:60:B0:45:93:02 and is operating at 5.3 GHz.

$PNAVA,N747ER,,,,,,*09<CR><LF>

This message instructs the mobile component 14, on the aircraft 16 identified by N747ER, to associate with any available access point 204. This message will be sent when the APCS computer 220 deems that the mobile component 14 is outside the defined coverage areas of all known access points 204.

Request Sentence (PNAVR)
General Description

This sentence may be sent from the APCS computer 220 to the mobile component 14 at any time. This message instructs the mobile component 14 to transmit the specified sentence(s). There are fields defined for requesting up to four sentences. The request field shall contain the alphabetic portion of the sentence identifier for the desired message.

Message Template
An exemplary message template is as follows:
$PNAVR,b,c,d,e,f*zz<CR><LF>
Field Description Table

| Field ID | Description | Data Type | Character Limit |
|---|---|---|---|
| b | Vehicle Identifier/Tail Number | Text | 20 |
| c | Sentence Identifier 1 | Text | 7 |
| d | Sentence Identifier 2 | Text | 7 |
| e | Sentence Identifier 3 | Text | 7 |
| f | Sentence Identifier 4 | Text | 7 |
| z | Checksum (Hex) | Fixed | 2 |

Example

A specific exemplary message is as follows:
$PNAVR,N747ER,PNAVF,PNAVC,,*1f<CR><LF>

This message instructs the mobile component 14, on aircraft 16 identified by N747ER, to transmit the "Tunable Frequency List" message, PNAVFx, and the "Configuration and Version" message, PNAVC.

Message Acknowledge Sentence (PNAVM)
General Description

This sentence may be sent from the APCS computer 220 to the mobile component 14 to acknowledge receipt of any sentence type. It is not required that each PNAVL message receive an acknowledgement, but an acknowledgement is required periodically. In general, this message indicates to the mobile component 14 that the communication path is still viable. With respect to the PNAVC and PNAVFx sentences, the acknowledgement is for a specific message and each one should be individually acknowledged.

Message Template
One specific message template is as follows:
$PNAVM,b,c*zz<CR><LF>
Field Description Table

| Field ID | Description | Data Type | Character Limit |
|---|---|---|---|
| b | Vehicle Identifier/Tail Number | Text | 20 |
| c | Sentence Identifier | Text | 7 |
| z | Checksum (Hex) | Fixed | 2 |

Example

One specific, exemplary message is as follows:
$PNAVM,N747ER,PNAVF2*54<CR><LF>

This message informs the mobile component 14, on aircraft 16 identified by N747ER, that the APCS computer 220 has received the third sub-part of the PNAVF message. This will prompt the mobile component 14 to send the fourth sub-part, if required. Acknowledgements for other than the current PNAVF sub-part will be ignored.

$PNAVR,N747ER,PNAVL*73<CR><LF>

This message informs the mobile component 14, on aircraft 16 identified by N747ER, that the APCS computer 218 has recently received a PNAVL sentence. It is not an acknowledgement of any specific message. It is just an indication that the APCS computer 218 is receiving data and that the communication path is still viable. Lack of periodic PNAVL acknowledgements will cause the mobile component 14 to re-establish a communication link with the APCS computer 218.

Processing Messages From Communications component 14
General Description

The APCS monitor service computer 218 must listen for data messages from each communications component 14 and respond appropriately. There are three message types that a mobile component 14 will send to the APCS computer 218. The APCS monitor computer 218 is responsible for validating, acknowledging, and recording the contents of each mobile component 14 message received. Each acknowledgement message generated should be returned to the mobile component 14 via the UDP port number specified in the original message. Invalid messages should be ignored.

Stimulus/Response Sequences

When the APCS monitor computer 218 receives a valid PNAVC message, it must respond by sending a PNAVM message back to the mobile component 14 as an acknowledgement of the PNAVC message. The content of the PNAVC message will be recorded in the SQL database (222 or 224) for use by the response APCS computer 220. The PNAVC message contains the version numbers for the mobile component 14 application and APCS/mobile component 14 protocol that the mobile component 14 is using. The response service needs this information to formulate commands that are compatible with each individual mobile component 14.

When the monitor APCS computer 218 receives a valid PNAVFx message, it must respond by sending a PNAVM message back to the mobile component 14 as an acknowledgement of the PNAVFx message. The content of the PNAVFx message will be recorded in one of the SQL databases 222,224 for use by the response service. The PNAVF message contains a list of the frequencies that the mobile component 14 is capable of tuning. There may be multiple PNAVFx sub-messages required to complete the entire list of possible frequencies. The response APCS computer 220 must have this information before it can determine which communications access points 204 have capabilities that are compatible with the individual mobile component 14.

When the monitor APCS 218 receives a valid PNAVL message, it must record the content of the PNAVL message in one of the SQL databases 222,224 for use by the response APCS computer 220. It is not required to generate an acknowledgement for each PNAVL message received. But, the monitor APCS computer 218 must regularly respond by sending a PNAVM message back to the mobile component 14. In this case, the acknowledgement is more an indication, to the mobile component 14, that the communication path is operational. The PNAVL message contains the location and other dynamic data from the mobile component 14. The response service will utilize this information when it calculates the list of desirable access points 204.

Functional Requirements

The monitor APCS computer 218 must listen for messages from a mobile component 14 on the configured port.

The monitor APCS computer 218 must transmit an acknowledgement, in the form of a PNAVM message, for each valid PNAVC or PNAVFx message received.

The monitor APCS computer 218 must regularly transmit an acknowledgement, in the form of a PNAVM message, as long as it continues to receive a stream of PNAVL messages from a mobile component 14.

The monitor APCS computer 218 must update the SQL database (222 or 224) based upon the contents of each valid PNAVC, PNAVFx, or PNAVL message received.

Selecting a Mobile Component 14 for Service

Description

The APCS response computer 218 will constantly search one or both of the SQL databases 222,224 looking for a mobile component 14 that warrants a PNAVA response. When multiple servers are in use, part of the selection criteria is that no other server is already in the process of generating a response. Other criteria that determine the need for a PNAVA response include a number of items as outlined below.

At least one second has expired since the last PNAVA message was sent to the mobile component 14. The generation of PNAVA messages must be throttled so that the mobile component 14 is not flooded with tuning requests and that the bandwidth is not wasted with duplicate commands The last known location data must be recent. If the current location of the aircraft 16 is not known with some certainty, then directing the mobile component 14 to use a particular access point 204 could be problematic. If the selected access point(s) were outside the range of the mobile component 14, then an active connection will be delayed while the mobile component 14 attempts to communicate via the inappropriate access point(s) 204.

The version numbers of the mobile component 14 application and the APCS/mobile component 14 Interface Protocol must be available. Having these version numbers allows the response service to generate a command that will be compatible with the mobile component 14 and the protocol that it is using. If the version information is not available, the mobile component 14 should not be selected and no response should be generated. The APCS 220 has the option of requesting the version information from the mobile component 14 at any time. The format of this request is assumed to be consistent in every version of the APCS/mobile component 14 Interface Protocol, past, present, and future.

The frequency list, which represents the tuning capabilities of the mobile component 14 wireless client, must be available. An access point 204 selection cannot be made until the tuning capabilities of the mobile component 14 are defined. If the frequency information is not available, the mobile component 14 should not be selected and no response should be generated. The monitor APCS computer 218 has the option of requesting the frequency information from the mobile component 14 at any time.

Stimulus/Response

After a response server sends a PNAVA message to a mobile component 14, it will begin searching the database (i.e., either SQL database 222, 224 or both) for another mobile component 14 to service.

Functional Requirements

The APCS response computer 220 will search one or both of the SQL databases 222,224 for a mobile component 14 that is a candidate for a PNAVA response.

Sending Tuning Data to the Mobile Component 14

Description

The APCS response computer 220 can formulate and send the access component 204 point selection message to the mobile component 14, as it deems necessary. It is not required that the APCS response computer 220 generate the PNAVA message with any regularity. The APCS response computer 220 should send the PNAVA message when the currently calculated list is different from the last list transmitted. Once the computer 220 has scanned for and identified a mobile component 14 that meets the selection criteria, it can compile the list of preferred access points 204.

The generation of the preferred access point list is a complex task. The APCS response computer 220 must scan the access point database in the SQL database (222 or 224, or both) entries and determine which access points meet the basic criteria. An access point is a potential candidate if it is currently in service, operates on a frequency within the tuning range of the mobile component 14, and has a coverage footprint that includes the last known location of the mobile component 14. The next operation is to sort this preliminary list by the distance between the mobile component 14 and the access point 204.

If the aircraft 16 is moving, then this list is really a historic view of the available access points 204. Since the mobile component 14 provides a time reference for its speed, heading, and location data, some projection can be made as to the aircraft 16 location at the current time. This projection can be used to generate another list of possible access points that may be valid now. A third list of access points could be generated that represents the available access points a few seconds into the future.

Since the current and future position of the aircraft 16 is uncertain, the validity of each list must be weighted accordingly. The position of an access point 204 on each list can be combined with the weighting factor for that list and this can be used to generate a single prioritized list. Considering the bandwidth available for each potential access point 204 may further modify the list order. Other factors that could influence the access point priority include the identity of the last access point that the mobile component 14 associated with and the signal quality of that connection.

Once the master list is complete, the top three choices can be sent to the mobile component 14 for implementation. If the APCS response computer 220 determines that there are no valid candidates, it can send a null list to the mobile component 14. This will cause the mobile component 14 to revert to an autonomous mode of operation. The mobile component 14 will scan for any potential access point 204 and make its own selection.

Stimulus/Response Sequences

When it is determined that a mobile component 14 is a candidate to receive a PNAVA message, the APCS response computer 220 must evaluate the available access points and generate a list of preferred access points. This information can be sent to the mobile component 14 in the form of a PNAVA message.

Functional Requirements

The APCS response computer 220 must determine which access points, if any, are visible to the mobile component 14.

The APCS response computer 220 must prioritize the list of potential access points using data about the aircraft 16 and the access points 204.

The APCS response computer 220 may transmit this information to the mobile component 14 for implementation.

External Interface Requirements

Activity Log

The APCS computers 218, 220 may each generate an activity log for maintenance purposes. The log file should be rotated periodically by log file size and/or time. A rotated log should maintain the same name and storage location, but with a different extension. At least three rotation logs are preferably maintained along with the currently active log.

When the system 200 is started, a log entry is preferably be made which lists the application and protocol versions plus the configuration parameters.

Each log entry should contain the date and time. Error entries should be made when any situation prevents the application from fulfilling its purpose. The error entry should include a brief but telling description of the problem.

Each APCS computer 218,220 may additionally have a TCP/IP "debug port" where it will accept a connection and, upon completion of an authentication process, will send all log information in real time to a connected computer or service.

Communications Interfaces

All communications between the mobile component 14 and the APCS computers 218,220 will take place via UDP (Uniform Datagram Protocol) using the APCS computers 218,220 and the mobile component 14 Interface Protocol.

The description of the system and method is merely exemplary in nature and, thus, variations that do not depart from the gist of the present disclosure are intended to be within the scope of the appended claims. Such variations are not to be regarded as a departure from the spirit and scope of the present disclosure.

What is claimed is:

1. A system for managing communications with a mobile platform operating within a pre-defined geographic region, the system comprising:

a mobile platform communications component located on said mobile platform for determining a location of said mobile platform while said mobile platform is operating within said pre-defined geographic region;

first and second antennas located on said mobile platform, the first and second antennas being configured to operate on different frequencies;

a ground based component including a plurality of antenna substations located at spaced apart locations about said pre-defined geographic region and each forming a wireless access point;

a wide area network accessible by said mobile platform via one or more of said wireless access points;

a control system in communication with said mobile platform via said wide area network and at least one of said wireless access points; and said control system including:

a database for storing information pertaining to said mobile platform and said ground based component; and a computer for analyzing location and real time speed of travel information received from said mobile platform and using said database to assist in selecting a specific antenna from one of said antenna substations with which said mobile platform communications component is to use for communicating with a communications network, said selection being made based at least in part on real-time location information for said mobile platform and said real time speed of travel of said mobile platform;

wherein each said antenna substation is comprised of at least one directional antenna and at least one omnidirectional antenna, and wherein said directional antennas of said antenna substations are arranged to transmit in different directions to avoid interference with one another; and wherein each said antenna substation is dedicated to transmitting a beacon signal with an identification code, on a different frequency; and wherein said mobile platform communications component is adapted to select the first antenna and to use the first antenna to scan the different frequencies of the omnidirectional antennas, and uses a signal strength of each received one of the identification codes to initially determine which one of said antenna substations to form an initial communications link with; and wherein the control system is adapted to recognize;

when said mobile platform is travelling within a first predetermined speed range, and then to limit potential ones of said antenna substations that are used to form a subsequent communications link with said mobile platform to a first subset of all available ones of said antenna substations, the first subset of antenna substations being determined in part on a direction that the mobile platform is determined to be travelling, and being limited to those ones of the antenna substations that are within a next zone of said access points that the mobile platform is approaching;

and when the control system recognizes that said mobile platform is exceeding said predetermined speed range, said control system makes use of a second subset of antenna substations that are within a predetermined distance of the mobile platform; and when the speed of the mobile platform is below the predetermined speed range, then the control system enables any one of said antenna substations that are available for use to be used in forming the subsequent communications link.

2. The system of claim 1, wherein said computer comprises first and second independent computers in communication with each other, said first computer dedicated to monitoring communications from said mobile platform and to communicate information pertaining to said mobile platform to said database; and said second computer dedicated to accessing said database and using said database in formulating a decision as to which one of said access points said mobile platform is to use for communicating with said communications network.

3. The system of claim 2, wherein said database comprises a structured query language (SQL) database.

4. The system of claim 1, wherein said control system is in simultaneous communication with a an additional plurality of ground based components located in an additional plurality of remote geographic regions via said wide area network.

5. The system of claim 1, wherein said location information is derived by said control system through multi-lateration techniques.

6. The system of claim 1, wherein said location information is derived from Global Positioning Satellite information and supplied: to said control system by said mobile platform communications component.

7. A method for managing communications within a pre-defined geographic area between a mobile platform operating within the pre-defined geographic area and a control system, comprising:
  providing a plurality of ground-based antenna substations, each one of said antenna substations being disposed at a different fixed location within the geographic area, to form a plurality of wireless access points available for said mobile platform to wirelessly access;
  using said control system to bidirectionally communicate with said mobile platform as said mobile platform operates within said geographic area;
  using said control system to receive information relating to speed of travel and direction of travel of said mobile platform as said mobile platform operates within said geographic region;
  using said control system to analyze said information to determine if said mobile platform is operating:
    at a speed above a predetermined speed range, and when said mobile platform is operating at a speed above said predetermined speed range, then limiting ones of said wireless access points that said mobile platform is able to access to only those that are within a predetermined distance of the mobile platform;
    at a speed within said predetermined speed range, and when said mobile platform is operating at a speed within said predetermined speed range, then determining a direction of travel of said mobile platform and limiting ones of said wireless access points that said mobile platform is able to access to only those within a zone of ones of the access points that said mobile platform is approaching; and
    at a speed below said predetermined speed range, and when said mobile platform is operating at a speed below said predetermined speed range, then enabling said mobile platform to access any one of said access points that are available for use in any approved sector of the pre-defined geographic area;
  instructing said mobile platform, in real time, as to which one of said antenna substations to use to maintain said communications link in a manner which reduces a frequency with which said mobile platform is required to switch from one said antenna substation to another said antenna substation;
  said control system further setting a signal-to-noise threshold for said communications link for switching a mobile platform from one of said antenna substation to a different one of said antenna substation, and lowering said signal-to-noise threshold when a total number of mobile platforms accessing said one antenna substation exceeds a predetermined number;
  wherein said using a plurality of antenna substations comprises:
    using a plurality of antenna substations each having at least one directional antenna and at least one omnidirectional antenna;
    each one of said antenna substations transmitting a beacon signal with an identification code on a different frequency from the other ones of said omnidirectional antennas; and
    wherein said mobile platform communications component is adapted to scan the different frequencies of the omnidirectional antennas and to use a signal strength of each received one of the identification codes to initially determine which one of said antenna substations to form a communications link with.

8. The method of claim 7, further comprising locating said control system remotely from said geographic area, and using a wide area network to communicate between control system and mobile platform.

9. The method of claim, 8 further comprising:
  using said wide area network and said control system to simultaneously enable communications between said control system and a plurality of mobile platforms operating in a plurality of independent, geographic regions remote from each other and from said control system; and
  using said control system to assist each of said mobile platforms operating in each of said plurality of independent geographic regions in selecting which of said antenna substations to select for use.

10. The method of claim 7, further comprising using said control system to monitor and compare loading of at least a pair of said antenna substations in determining which one of said antenna substations said mobile platform should be instructed to use.

* * * * *